United States Patent [19]

Herman et al.

[11] Patent Number: 5,414,507
[45] Date of Patent: May 9, 1995

[54] FIBER OPTICS PRESSURE SENSOR TRANSDUCER HAVING A TEMPERATURE COMPENSATOR

[75] Inventors: Elvin E. Herman, Pacific Palisades, Calif.; Bart E. Likes, Issaquah, Wash.; Douglas A. Norton, Alliance, Ohio; J. Douglas Smith, Houston, Tex.

[73] Assignee: Hughes Aircraft Company, Los Angeles, Calif.

[21] Appl. No.: 45,338

[22] Filed: Apr. 1, 1993

[51] Int. Cl.$^6$ .............................................. G01B 9/02
[52] U.S. Cl. .................... 356/345; 250/227.21
[58] Field of Search ................. 356/345, 358; 250/227.19, 227.27, 227.21, 231.19; 385/12, 13, 14

[56] References Cited

U.S. PATENT DOCUMENTS

| | | | |
|---|---|---|---|
| 3,635,562 | 1/1972 | Catherin | 356/352 |
| 5,113,070 | 5/1992 | Smith | 250/227.21 |
| 5,170,459 | 12/1992 | Norton et al. | 385/128 |

*Primary Examiner*—Samuel A. Turner
*Assistant Examiner*—Robert Kim
*Attorney, Agent, or Firm*—L. A. Alkov; W. K. Denson-Low

[57] ABSTRACT

Improved fiber optics pressure sensor transducers utilizing fiber optics in an interferometer sensing element. Included is a bellows-type pressure-to-movement converter that translates sensed pressure into linear displacement. That displacement is mechanically coupled to, and thereby varies the length of one leg of a fiber optics interferometer as a function of pressure. A temperature compensator is attached to the sensing or reference optical fiber of the interferometer. The temperature compensator causes corrective changes in the length of that optical fiber to which it is attached, thereby compensating for opposing temperature effects on other parts of the interferometer. Threaded studs attached to flexible stress reducers which are in turn coupled to optical fiber grippers provide means for adjusting interferometer optical fiber pre-tension and rotation to optimize polarization. In combination, the threaded studs with their attached flexible stress reducers, coupled via fiber grippers to the interferometer optical fibers, serve to minimize fiber bending and localized stress points which otherwise might weaken the tensioned fibers of the interferometer. A bourdon tube embodiment of the pressure-to-movement converter having a curved tang and attached flexible link converts rotational motion of the bourdon tube movement end to linear displacement.

23 Claims, 4 Drawing Sheets

FIBER OPTICS PRESSURE SENSOR TRANSDUCER HAVING A TEMPERATURE COMPENSATOR

BACKGROUND OF THE INVENTION a. Field of the Invention

The present invention relates to pressure transducers. More specifically, the present invention relates to pressure transducers which convert changes in pressure into changes in the length of a sensing optical fiber and which measure that length change using interferometer measuring techniques.

b. Description of Related Art

Various applications require precise readout of pressure. A principal application is the instrumentation of pressure in oil wells. In many such oil well installations, the pressure sensor transducer must be placed deep in the well where the temperatures and pressures are very high, and replacement of the transducer is an involved and costly process. On-going pressure measurement in an oil well is an important parameter in maximizing its overall oil yield over the life of the well.

One technique that has advantageously been used in remote pressure measurement utilizes fiber optics in the sensor. Changes in the pressure to be measured are converted into mechanical movement. That movement, in turn, causes changes in the length of a sensing optical fiber. The length of a reference optical fiber is then compared to the length of the sensing optical fiber. The length of a reference optical fiber is then compared to the length of the sensing optical fiber using traditional interferometer techniques. Changes in this relative measurement serve as a measure of changes in pressure.

Fiber optics pressure sensors that utilize a single wavelength light source along with traditional interferometer measurement techniques are primarily useful as sensors of pressure change, not the actual pressure value. If the need is to measure pressure accurately as well as pressure change, an ambiguity problem arises. That pressure measurement ambiguity occurs in the interferometer output of the pressure sensing transducer if a single wavelength light source is used. The ambiguity arises whenever the differential length change in the pressure sensor interferometer exceeds one wavelength of light, or a multiple thereof. If the pressure sensor interferometer differential length is constrained by design to be less than one wavelength of light, then the ambiguity is avoided, but pressure measurement accuracy becomes difficult if the pressure range to be sensed is large.

Alternatively, a swept wavelength light source could be used to resolve interferometer ambiguities and thus provide good accuracy over a large pressure range. But present-day solid state lasers suitable for optical coupling into an optical fiber are prone to mode hopping, instead of wavelength sweeping smoothly. Furthermore, the wavelength excursion of the light source must be measured in order to calculate the sensed pressure.

A technique that provides good pressure accuracy over a wide pressure range, while avoiding these measurement ambiguities in the fiber optics interferometer, is taught in U.S. Pat. No. 4,859,844, issued to E. Herman, et al., entitled COMB FILTER PRESSURE/TEMPERATURE SENSING SYSTEM. In that invention, a wideband solid state (infra-red) light source is utilized along with a combination of optical and electronic signal processing in the remote readout apparatus. In that system, by dissecting the optical interference nulls created by the pressure sensor transducer interferometer across a relatively wide optical wavelength spectrum, and by measuring these nulls as a direct function of the optical source wavelength in the readout apparatus, good accuracy of pressure sensing is achieved over a large pressure range. The fiber optics pressure transducer of the present invention is directly applicable for accurately measuring pressure in that sensing system.

Most fiber optics pressure sensor transducers also suffer several other problems. Changes in temperature often result in an indication of a pressure change when, in fact, no pressure change has taken place. Design imperfections in the pressure-to-motion converter often result in hysteresis, and overall non-linearities in the measurement system. Adjusting the tension of the sensing optical fiber and rotating it to optimize polarization are operations which are also often difficult to perform.

SUMMARY OF THE INVENTION

It is a primary object of the present invention to obviate these, as well as still further problems in the prior art of pressure sensor transducers that utilize a fiber optics interferometer as the sensing means.

It is a further object of the present invention to provide a fiber optics pressure sensor transducer whose accuracy is substantially unaffected by temperature changes.

It is a still further object of the present invention to provide a fiber optics pressure sensor transducer that accurately measures pressure over a large pressure range, and maintains that accuracy over a long life span, even in the adverse environments to which such pressure sensor transducers are sometimes subjected.

It is a still further object of the present invention to provide a fiber optics pressure sensor transducer in which the tension and polarization of the optical fibers of the interferometer can be easily adjusted.

These as well as still further features, objects and benefits of the present invention are achieved through the use of several improvements to existing fiber optics pressure sensor transducer technology. Included is a temperature compensator which is mechanically coupled via a flexible stress reducer and gripper to the sensing or reference optical fiber. As a function of temperature, that temperature compensator provides corrective changes in the length of the optical fiber to which it is mechanically coupled. Adjustment means are provided to pre-tension the optical fibers of the interferometer, and to permit rotational adjustment of one fiber of the interferometer with respect to the other so as to optimize polarization of the reflected light and thereby maximize the depth of interference nulls. An optional vernier turnbuckle is described for use in-line with one optical fiber leg of the interferometer to facilitate adjustment of fiber pre-tension during assembly and calibration of the transducer.

These as well as still further objects, features, and benefits of the present invention will now become clear from an examination of the following Detailed Description of the Preferred Embodiments, taken in conjunction with the accompanying drawing.

DESCRIPTION OF THE PREFERRED EMBODIMENTS

Figure 1:
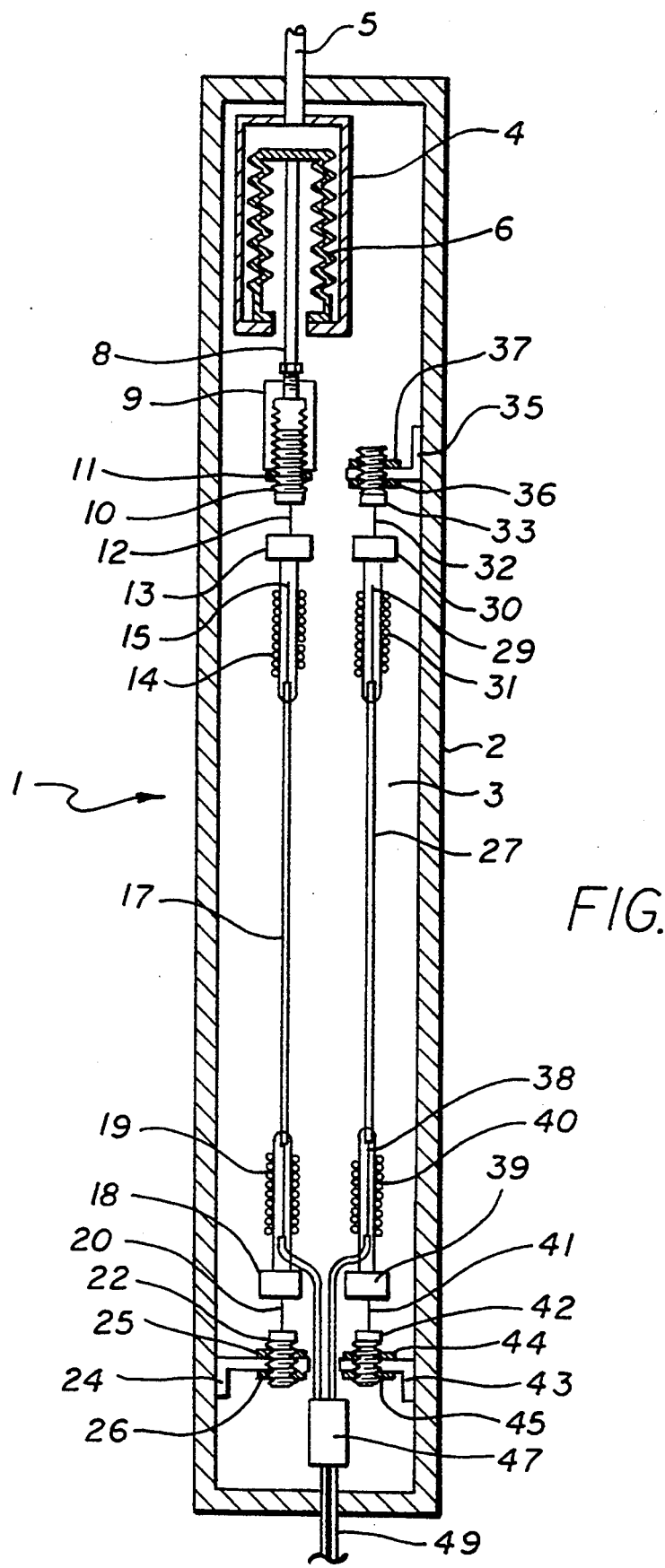
FIG. 1 is a cross sectional view, and illustrates the fiber optics pressure sensor transducer of the present invention configured with a bellows type pressure-to-movement converter, and incorporating many of the principal features of the present invention.

FIG. 1 illustrates one preferred embodiment of the present invention.

As shown in FIG. 1, a pressure sensor transducer outer enclosure is a cylindrical (or alternatively an oblately cylindrical) container 2. A pressure chamber 4 is contained inside the container. That opening allows the pressure in chamber 4 to equalize with the pressure to be measured. In the embodiment shown in FIG. 1, a pressure-to-movement converter in the form of a bellows 6, typically made of metal, separates the pressure chamber 4 from the other interior regions 3 of the transducer container 2.

The result of the configuration is that the pressure to be measured causes a corresponding contraction or expansion of the bellows within the pressure chamber 4.

Linear movement of the bellows 6 is transmitted by a translation stem 8. That translation stem 8 is mechanically coupled to the temperature compensator 9. The translation stem 8 is free to travel without any friction contact with the walls of pressure chamber 4. The temperature compensator 9 is, in turn, mechanically coupled by means of the threaded stud 10 to a flexible stress reliever 12. The other end of the flexible stress reliever 12 is embedded in the end of the fiber gripper 13 which, in turn, is attached to the sensing optical fiber 17. Sensing optical fiber 17 is cleaved and silvered to provide a highly reflective end at point 15 where it terminates in the polymer molded fiber gripper 13.

The fiber gripper 18 on the other end of the sensing optical fiber 17 is mechanically coupled via another threaded stud 22 and stress reliever 20 to the inner wall of the container 2 by means of a bracket 24. Locking nuts 25 and 26 serve to firmly clamp the threaded stud, after fiber pre-tension and rotation for optimum polarization are set.

Serving as the other leg of the optical interferometer, one end of reference fiber 27 is cleaved and silvered. That end terminates within the polymer molded fiber gripper 30 at point 29 of FIG. 1. Encapsulation within the polymer provides protection to the silvered fiber end. The reference fiber 27 of the interferometer is mechanically held at each end by fiber grippers 30 and 39 respectively which are, in turn, mechanically coupled, via flexible stress reliever members 32 and 41 and threaded studs 33 and 42 to brackets 35 and 43 affixed to the inner wall of container 2. Here again, fiber pre-tension and rotational adjustment is provided by use of threaded nuts 36, 37, 44 and 45 which serve to firmly clamp the threaded studs at the ends of the stress relievers to the wall brackets.

The input/output ends of the sensing optical fiber 17 of FIG. 1, and the reference optical fiber 27 pass completely through the polymer molded fiber grippers 18 and 39, and are optically combined in an optical coupler/splitter 47. Those sensing and reference optical fibers with their reflective ends, along with the optical coupler/splitter comprise the interferometer of the pressure sensor transducer.

The input/output of the optical splitter/combiner 47 is, in turn, directed through a transmission optical fiber 49 through the container 2 wall to a remote readout apparatus. That transmission optical fiber 49 serves both to relay light from the remote readout apparatus to the pressure sensor transducer interferometer, and to relay the light output from that interferometer back to the remote readout apparatus (now shown, but such as described in the above-referenced U.S. Pat. No. 4,859,844).

Typically, when the pressure sensor transducer is positioned in its operating position in an oil well, it is vertical with the pressure-to-movement converter (e.g., the bellows) at the top, and is attached to the production pipe of the well. Referring to FIG. 1, the inner chamber 3 of transducer 2 is preferably filled with a fluid such as an oil to a height slightly above the fiber grippers 13 and 20 that hold the terminated ends of the interferometer. That fluid serves primarily to provide viscous damping to minimize differential vibration between the interferometer fibers. Sufficient air space is provided above the oil in the transducer container 2 to allow the bellows 6 to be compressed as a result of an increase in sensed pressure.

Configured as shown in FIG. 1 and as described above, the pressure-to-movement converter (in the form of, for example, a bellows 6 of FIG. 1), the translation stem, temperature compensator, flexible stress relievers, the fiber tension and rotational adjustment means in the form of threaded studs, the optical coupler/splitter 47, the sensing optical fiber 17, and the reference optical fiber 27 (each with its encapsulated reflective end) form the principal elements of the fiber optics pressure sensor transducer. Through the use of the remote readout apparatus (not shown, but as described in the above-referenced U.S. Pat. No. 4,859,844), length differences between the legs of the sensing fiber 17 and reference optical fiber 27 can readily be measured unambiguously by processing of the interferometer output, thereby providing an output directly proportional to the sensed pressure.

The pressure to be measured causes a corresponding degree of contraction (or expansion) of the bellows 6 and, in turn, movement of the translation stem 8, and an associated change in the length of the sensing fiber 17 of the interferometer. Since the length of the reference fiber 27 will not undergo similar length changes, the readout apparatus, by remotely measuring the differential length between the two fibers of the interferometer, can effectively measure the pressure to be sensed.

Figure 2:
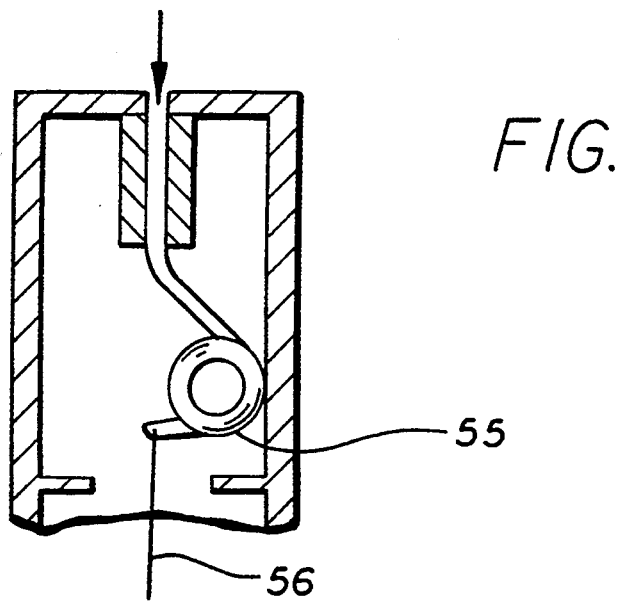
FIG. 2 shows a cross sectional view of the pressure-to-movement portion of the transducer shown in FIG. 1, except that a bourdon tube has been substituted for the bellows shown in FIG. 1.

FIG. 2 illustrates the upper portion of the pressure sensor transducer 1 shown in FIG. 1, except that a bourdon tube 55 and a pivoted flexible stress reducer member 56 have been substituted for the bellows 6 and translation stem 8 of FIG. 1.

One problem with fiber optics interferometer-type pressure sensors, using either a bellows or a bourdon tube, is that changes in temperature can cause unequal changes in the lengths of the sensing fiber 17 and the reference fiber 27. A principal cause is thermal expansion in the pressure-to-movement converter. Another much less significant potential cause is unequal lengths in the flexible stress removers and fiber grippers. Unless compensated in some way, such temperature effects might erroneously cause an error in the sensed pressure, or an indicated change in pressure when, in fact, there has been no change in pressure.

The temperature compensator 9 shown in FIG. 1 is one embodiment of the invention which advantageously compensates for this potential problem. It does so by expanding or contracting in length, as a function of temperature. The expansion rate is pre-set to be opposite of the rate at which temperature changes cause a difference between the lengths of the sensing fiber 17 and the reference fiber 27. In this way, overall differential length changes as a function of temperature are substantially eliminated, along with erroneous measurements caused by changes in temperature.

In each system, the compensation rate which the temperature compensator 9 must exhibit for maximum temperature insensitivity will vary, even among systems of the same design. Accordingly, the temperature compensator 9, for maximum utility, should be capable of having its thermal expansion rate easily adjusted during assembly and calibration.

Figure 6:
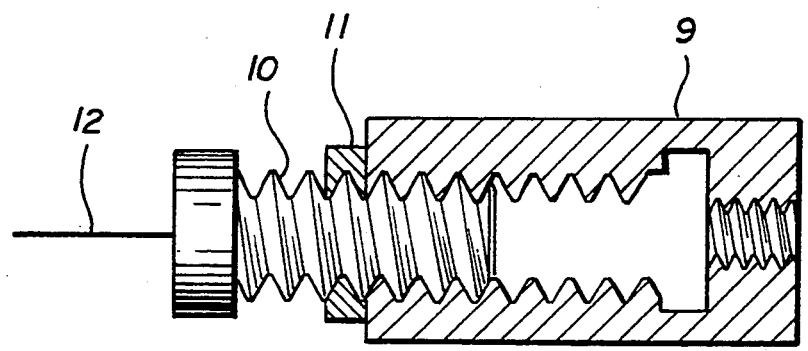
FIG. 6 illustrates a preferred embodiment of the temperature compensator portion of the present invention. Also shown here is a flexible stress reliever member extending from that temperature compensator to provide mechanical coupling to the pressure-to-movement converter.

FIG. 6 illustrates a preferred embodiment of the temperature compensator 9 shown in FIG. 1. This embodiment allows the rate of expansion and contraction to be easily adjusted.

As shown in FIG. 1, and in an expanded cross-sectional view in FIG. 6, the temperature compensator 9 consists of an internally threaded body made up of a material having a coefficient of thermal expansion opposite in sign to the coefficient of expansions of the bellows (or the alternative bourdon tube) and the other components used in the interferometer and its attachment devices. Also shown in FIG. 6 is a threaded stud extending partially into the temperature compensator, and locked into place with a threaded locking nut 11. A flexible stress reducer is also shown extending downward from the threaded stud. The top of the temperature compensator is internally threaded to accommodate the translation stem or other mechanical coupler to the pressure-to-movement converter. The pressure-to-movement converter (the bellows or bourdon tube) are the principal contributors to thermal expansion that needs compensation. Because only differential length of the interferometer legs affect the pressure readout, the optical fibers comprising the interferometer contribute almost negligibly because their two lengths only differ by a few hundred wavelengths of light. The fiber grippers, the stress reducers, and the threaded attachment studs contribute slightly more to thermal expansion that needs compensation because they will differ in length slightly, due to fabrication and assembly tolerances.

Referring again to FIG. 1, one end of the temperature compensator 9 is coupled to the bellows 6 via translation stem 8, (or to a bourdon tube). The other end of temperature compensator 9 is internally threaded to accommodate the externally threaded stud 10 attached to the flexible ribbon (or wire) stress reliever 12, and thence to the sensing fiber gripper 17. The effective length of the temperature compensator, i.e., the amount of temperature compensation provided, is adjusted by varying the distance that the threaded stud is screwed into the temperature compensator 9. Shallow penetration of the threaded stud 10 into the temperature compensator 9 provides a greater degree of thermal compensation than a deep penetration because more of the temperature compensator can change in length without being constrained by the opposing coefficient of thermal expansion of the threaded stud.

The temperature compensator 9 is adjusted during assembly and calibration of the pressure transducer so that its coefficient of thermal expansion multiplied by its effective length, being opposite to the coefficients of expansion of the other members, effectuates the needed temperature compensation. The correct amount of insertion of the externally threaded stress reliever stud 10 into the temperature compensator 9 is achieved when the coefficient of thermal expansion of the temperature compensator, multiplied by its effective length, creates temperature-induced length changes which are substantially equal but opposite to, the temperature-induced relative length changes between the sensing and reference optical fiber. After the temperature compensator is adjusted, the locking nut 11 is tightened against the compensator 9 to prevent further relative movement between the threaded stud 10 and the temperature compensator 9.

Referring again to FIG. 1, each end of the two optical fibers of the pressure sensor transducer interferometer are embedded in molded in synthetic polymer fiber grippers. Such a gripper with its attached flexible stress reducer member, and the method of construction thereof is taught in co-pending patent application entitled Optical Fiber Attachment Means and Method, U.S. patent application Ser. No. 07/752,393, by Likes, Herman, and Norton. Because the thermo-setting synthetic polymer that makes up the fiber gripper shrinks as it cools, it firmly clamps the embedded optical fiber by applying area-distributed compressive force to the bared region of that fiber. Together with its attached flexible stress reducer member, that gripper permits axial tension to be applied to the interferometer fibers without bending or other localized forces that might otherwise weaken the tensioned fiber. (In that co-pending U.S. patent application Ser. No. 07/752,393, that flexible stress reducer member is referred to as a tension member because it also serves as a means for coupling axial tension to the fiber gripper).

Figure 4:
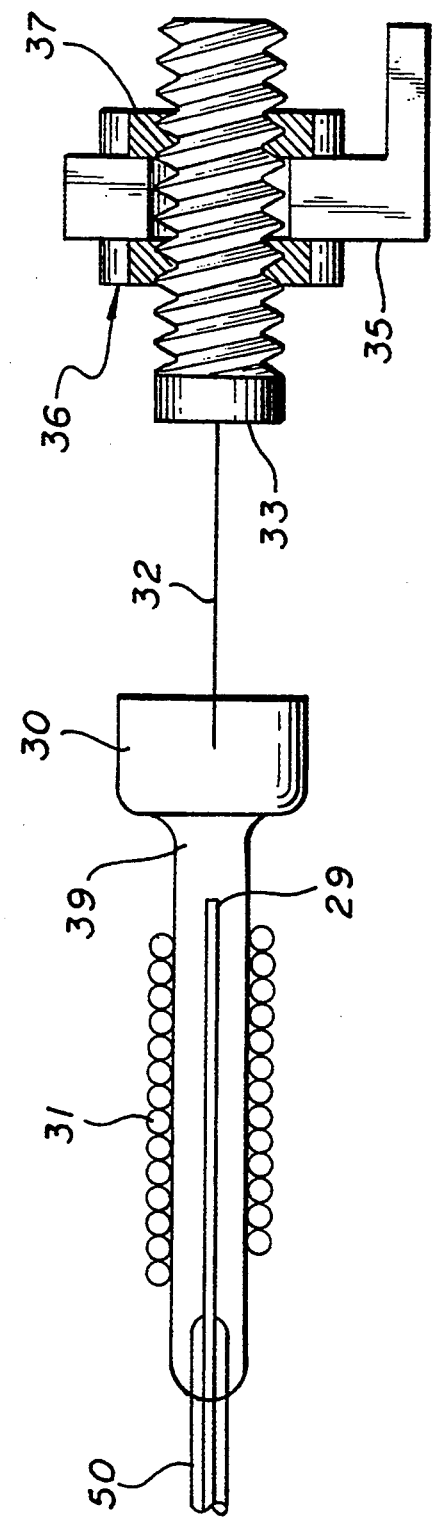
FIG. 4 illustrates in cross section an expanded view of a portion of FIG. 1 at the terminated end of the reference fiber of the interferometer.
Figure 5:
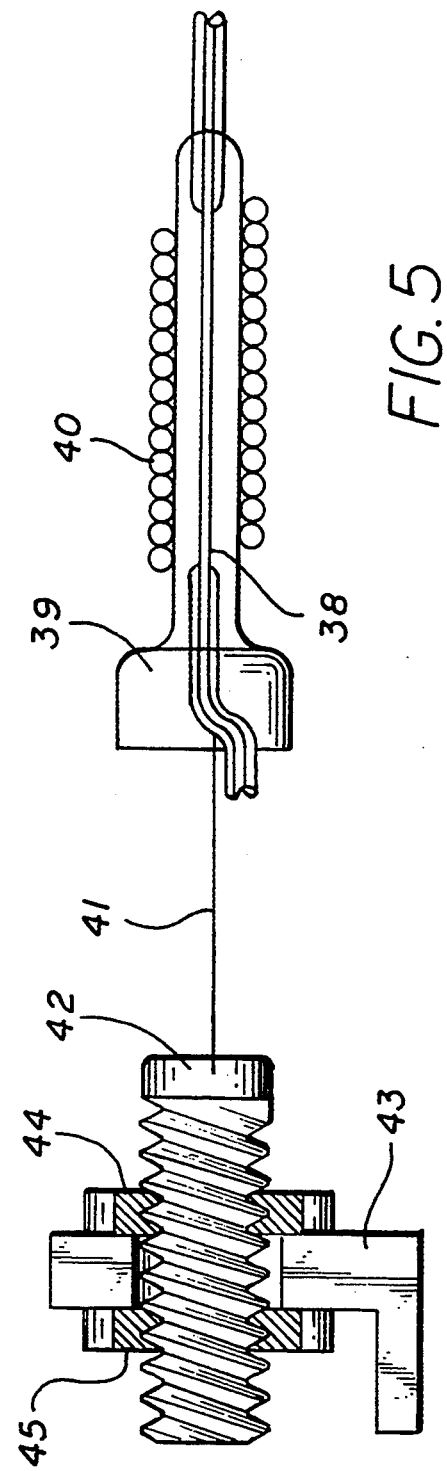
FIG. 5 illustrates in cross section an expanded view of another portion of FIG. 1 at the input/output end of the reference fiber of the interferometer.

FIG. 4 illustrates in cross section an expanded view of a portion of FIG. 1 at the terminated end of the reference fiber of the interferometer. In that expanded view, one configuration of a synthetic polymer molded fiber gripper with its flexible stress reducer member and attached threaded stud is shown. In that fiber gripper configuration, the reflective end of the optical fiber is terminated within the gripper. As typically configured and as shown in FIGS. 1, 4 and 5, the main body of a fiber gripper has a diameter of about 0.2 inch and is about 2 inches in length. The enlarged region of the gripper, as shown in FIGS. 1, 4 and 5 is optional and is about 0.5 inches in length and has a diameter of about 0.5 inches. That enlarged region serves to facilitate pouring of the hot synthetic polymer into the mold during the gripper fabrication process. With or without the optional enlarged region of the gripper, the flexible stress reliever member is embedded about 0.75 inches to 1 inch into the gripper.

FIG. 4 also illustrates how the threaded stud, attached to a flexible stress reducer member, is secured to the transducer inner wall bracket by means of locking nuts. That configuration of the gripper/stress reducer/threaded stud assembly is used on the terminated end of the reference fiber of the present invention.

FIG. 4 and FIG. 5 shows one embodiment of the co-pending patent application in which a tightly wound steel compression spring surrounds the central region of the gripper to constrain thermal expansion of the gripper body.

Referring again to FIG. 4, shown in an enlarged cross sectional view is the optical fiber gripper configuration 30 with its flexible stress reducer member 32 and attached threaded stud 33. That gripper configuration and assembly are utilized at the far end of the interferometer reference fiber. In that configuration, the optical fiber has its silvered (reflective) end terminated and encapsulated at point 29 within the fiber gripper 30. In FIG. 4, the threaded stud 33 is shown passing through a transducer internal wall bracket 35 where it is secured by locking nuts 36 and 37. That threaded stud with its locking nuts provide means for fiber pre-tensioning and fiber rotation to optimize polarization in one interferometer fiber leg with respect to the other.

The same configuration of gripper/flexible stress reducer/threaded stud, absent of the wall bracket, is used on the far end of the interferometer sensing optical fiber. There, as shown in FIG. 1, the threaded stud 10 is threaded into the temperature compensator 9.

The other optical fiber gripper configuration, shown in an enlarged cross sectional view in FIG. 5, is utilized at the two input/output ends of the interferometer optical fibers. In that gripper configuration, the optical fiber continues on through the gripper to the optical splitter/combiner 47 of FIG. 1. As is shown in FIG. 5, the gripper, like that shown in FIG. 4, also has a flexible stress reducer 41 and threaded stud 42 attached thereto. Both configurations of the optical fiber gripper, and its attached flexible stress reducers are taught in the above-cited co-pending patent application, U.S. patent application Ser. No. 07/752,393.

Both configurations of the fiber gripper assembly utilize flexible stress reducers to apply tension axially to the fibers of the interferometer. As taught in the co-pending U.S. patent application Ser. No. 07/752,393, that stress reducer (referred to in that co-pending patent application as a tension member) can be a thin flexible ribbon or wire which has high tensile strength, but is highly flexible in the coordinates in which transverse or rotational stresses might other be applied to and thereby weaken the optical fibers. Nichrome or steel are suitable materials for these stress reducers.

In a preferred embodiment of the above-referenced co-pending patent application, the synthetic polymer molded fiber grippers (one configuration shown in expanded view in FIG. 4, and the other in expanded view in FIG. 5) have tightly wound compression springs 31 and 40 respectively surrounding the central portion of the fiber grippers. These steel compression springs, having a lower coefficient of thermal expansion than that of the synthetic polymer fiber grippers, serve to counteract the outward expansion of the walls of the polymer molded grippers at high temperatures. Without that expansion constrainment of the polymer gripper by such a compression spring, the clamping force on the fibers would become weakened at high temperatures.

In application to the present invention, the polymer fiber grippers and flexible stress reducer members of the above-cited co-pending patent application are adapted in the present invention to include a threaded stud. (These threaded studs 10, 22, 33, and 42 are shown in FIG. 1). In particular, that adaptation consists of mechanically attaching an externally threaded stud (i.e., a short threaded rod) to the end of flexible stress reducer member (ribbon or wire) opposing the end embedded in the fiber gripper. The attachment is made at the center of the threaded stud so that the flexible stress reducer member extends directly outward from the stud's centerline. One method of achieving that mechanical attachment is to capture the end of the threaded ribbon (or wire) stress reducer by embedding it using high temperature synthetic polymer in a hole drilled centrally into the end of the threaded stud. The threaded studs provide means, not only for mechanical attachment and coupling axial tension to the two optical fibers of the interferometer, but also means for adjusting fiber pretension and rotation for polarization optimization.

In response to pressure changes, the pressure-to-movement converter, depending upon the particular design, often exhibits some components of motion other than directly along the longitudinal axis of the sensing optical fiber. Such undesired movement might, for example, be transverse and/or rotational. The bourdon tube 55 as shown in FIG. 2 is prone to both types of undesired motion. Such movement along an axis other than the longitudinal axis of the attached sensing optical fiber may cause fiber bending which, in turn, can cause corresponding errors in pressure measurement. The previously-described flexible thin ribbon (or wire) stress reliever 56 attached by a pivot to the bourdon tube can reduce this undesired effect. The pivot itself is also prone to cause hysteresis as the pressure changes. However, a still further and preferred embodiment of a bourdon tube implementation of the pressure-to-movement converter made in accordance with the present invention is shown in FIG. 3.

Referring again to FIG. 3, one end of a semi-circular tang 63 is attached to the movement end 61 of bourdon tube 60. Attached to an opposing end 66 of the tang 63 is a flexible attachment link 62. That flexible attachment link 62, consists of a thin flexible ribbon (or wire) of the type of material used in the above-described flexible stress reducers as taught in the above-referenced co-pending patent application. The semi-circular tang 63 has a center of curvature approximately the same as the center of curvature of the bourdon tube 60. The flexible attachment link lies along the surface of tang 63 to the point where it exits tangent to the tang. As the bourdon tube 60 expands or contracts, the exit angle of the flexible attachment link 62 remains essentially constant; there is negligible friction, and no rotational and very little transverse movement is applied to the sensing optical fiber.

Figure 3:
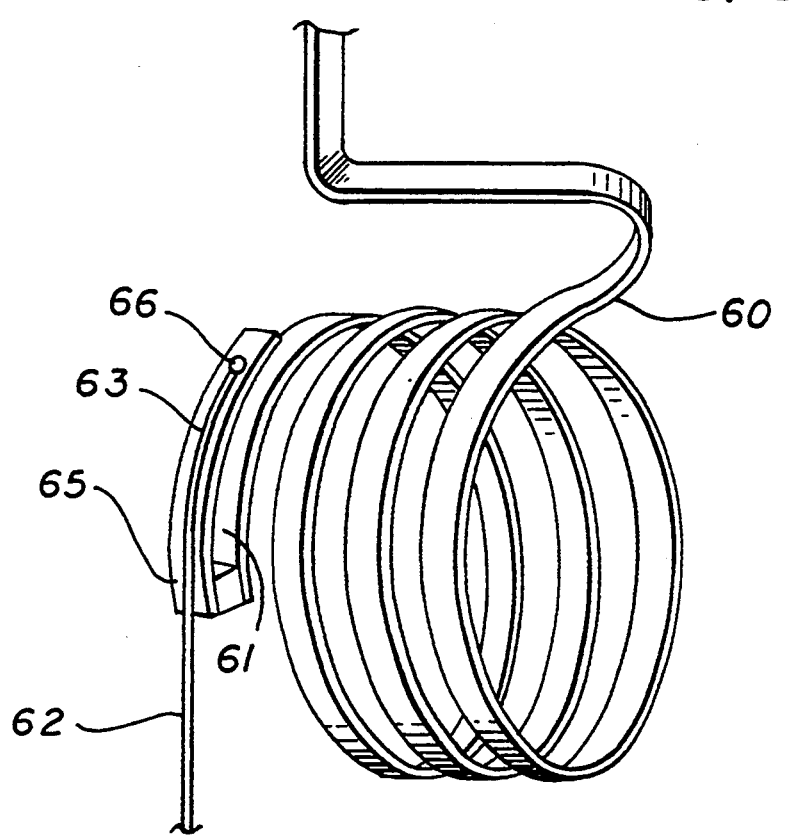
FIG. 3 illustrates a preferred embodiment of the pressure-to-movement portion of the present invention, when implemented with a bourdon tube and, in particular, a tang embodiment.

Still referring to FIG. 3, the end of the flexible attachment link 62 opposite to that attached to the tang of the bourdon tube is mechanically attached to the temperature compensator 9 of FIG. 1. (It should be noted that, alternatively, the temperature compensator 9 can be included in the reference optical fiber channel instead of in the sensing leg of the interferometer).

The synthetic polymer molded optical fiber grippers 13, 18, 30, and 39 of FIG. 1 should preferably be made in accordance with the above-referenced co-pending U.S. patent application Ser. No. 07/752,393.

Figure 7:
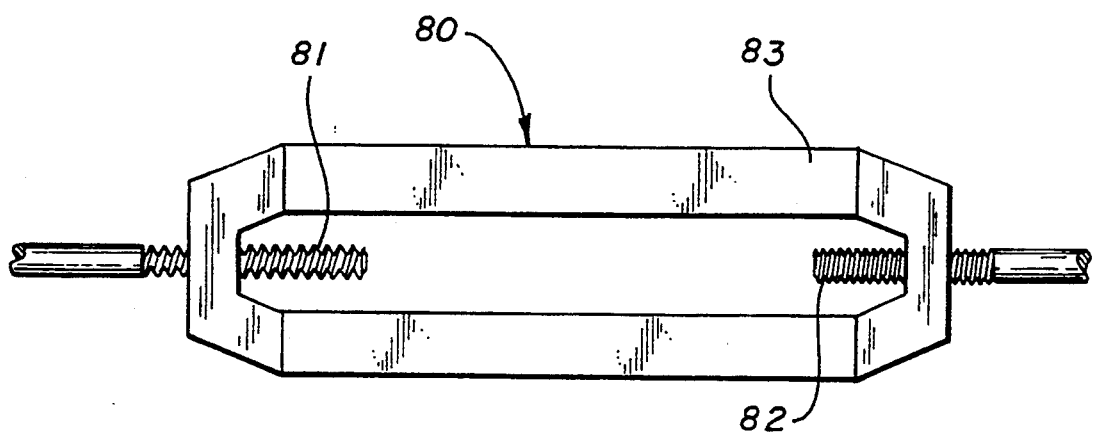
FIG. 7 illustrates a preferred embodiment of the vernier turnbuckle portion of the present invention.

To provide a vernier adjustment of optical fiber pretension (and fiber rotation to optimize polarization) in one or both of the two optical fibers comprising the interferometer, a vernier turnbuckle, such as that shown functionally in FIG. 7, can advantageously be used at one end of an optical fiber. In a preferred embodiment, the threads on both ends of that vernier turnbuckle 80 are configured so that, upon turning the center member of the turnbuckle, one threaded end-piece 81 moves inward, while the other turnbuckle end-piece 82 moves outward. To effect a vernier overall length change when the turnbuckle center piece 83 is rotated, the pitch of the threads on one end-piece differs slightly from those on the other end-piece. That same turnbuckle can also serve as a means of rotating the attached optical fiber to optimize polarization.

FIG. 5 illustrates in cross section an expanded view of another portion of FIG. 1 at the input/output end of the reference fiber of the interferometer. In that expanded view, the other configuration of the synthetic polymer molded fiber gripper with its flexible stress reducer member and attached threaded stud is shown. In that gripper configuration, the optical fiber extends on through the gripper. In both grippers the clad on the optical fiber extends about ⅛ inch into the gripper to provide mechanical protection, however most of the optical fiber embedded with the gripper is bared in order to allow the compressive force of the polymer to apply directly to the fiber.

FIG. 5 also shows how the threaded stud is secured in a transducer inner wall bracket by means of locking nuts. That configuration of the gripper/stress reducer/threaded stud assembly is used on the input-output ends of both interferometer fibers of the present invention. FIG. 5 also shows the tightly wound steel compression spring surrounding the central region of the gripper.

Both configurations of optical fiber grippers, the flexible stress reducer members, and the compression spring embodiment as shown in FIGS. 1, 4 and 5 of the present invention are taught in the above-referenced co-pending U.S. patent application Ser. No. 07/752,393.

Although having thus far discussed the present invention in terms of certain embodiments, it is, of course, to be understood that the present invention is not limited to these embodiments. Instead, it encompasses a broad variety of embodiments and equivalents. Indeed, the present invention is limited solely by the following claims and their equivalences.

We claim:

1. A fiber optic pressure sensor transducer, comprising:
   a converter for converting changes in pressure into movement;
   a sensor optical fiber of a fiber optics interferometer operatively connected to said converter so as to have an optical path length which changes as a function of the pressure changing induced movement of said converter;
   a reference optical fiber of a fiber optics interferometer which has an optical path length which is independent of the movement of said converter; and
   temperature compensating means, positioned at least substantially between adjacent ends of said sensing optical fiber and said converter, for causing a change in the length of said sensor optical fiber as a function of temperature.

2. The transducer of claim 1 wherein said converter includes a translation stem which is operatively attached to a distal end of said temperature compensating means.

3. The transducer of claim 1 wherein said temperature compensating means expands or contracts as a function of temperature to substantially prevent changes in the temperature surrounding said transducer from causing any difference between the optical path lengths of said sensor and reference optical fibers.

4. The transducer of claim 1 further comprising a flexible stress reliever operatively connecting adjacent ends of said temperature compensating means and said sensor optical fiber.

5. The transducer of claim 4 wherein said sensor optical fiber includes a proximal fiber gripper and a distal fiber gripper, and said flexible stress reliever is directly connected to said distal fiber gripper at an end opposite to said temperature compensating means.

6. The transducer of claim 4 wherein said temperature compensating means includes an internally threaded body and an externally threaded stud threaded a distance into said body, and said flexible stress reliever is secured at a distal end thereof directly to said stud.

7. The transducer of claim 6 wherein said temperature compensating means includes a locking nut which locks said stud in place relative to said body.

8. The transducer of claim 1 further comprising turnbuckle means positioned operatively in-line with said sensor or reference optical fiber for adjusting the tension and rotation of said in-line fiber to optimize polarization.

9. The transducer of claim 8 wherein said turnbuckle means comprises a vernier turnbuckle.

10. A fiber optic pressure sensor transducer, comprising:
    a converter for converting changes in pressure into movement;
    a sensor optical fiber of a fiber optics interferometer operatively connected to said converter so as to have optical path length which changes as a function of the pressure-changing induced movement of said converter;
    a reference optical fiber of a fiber optics interferometer which has an optical path length which is independent of the movement of said converter; and
    temperature compensating means for causing a change in the length, as a function of temperature, of one of said sensor or reference optical fibers, said temperature compensating means including an internally threaded body, an externally threaded stud screwed into said body a desired distance and a locking nut surrounding said stud for locking said stud at the desired distance.

11. The transducer of claim 10 further comprising turnbuckle means positioned operatively in-line with said sensor or reference optical fiber for adjusting the tension and rotation of said in-line fiber to optimize polarization.

12. The transducer of claim 11 wherein said turnbuckle means comprises a vernier turnbuckle.

13. The transducer of claim 10 wherein the desired distance corresponds to the desired thermal expansion rate of said temperature compensating means.

14. The transducer of claim 10 wherein said converter includes a mechanical coupler having a threaded end and said temperature compensating means has a threaded end relative to which said coupler threaded end is screwed.

15. A fiber optic pressure sensor transducer, comprising:
a container;
converting means for converting changes in pressure into movement;
a sensor optical fiber system including an interferometer sensor optical fiber, first proximal and distal grippers secured at respective opposite ends of said sensor optical fiber, a first threaded stud, a first bracket secured to and inside said container, a first stress reliever secured to and extending between said first proximal gripper and said first threaded stud, and first clamping means for clamping said first threaded stud to said first bracket to provide a desired sensor fiber tension and rotation;
wherein said sensor optical fiber is connected to said converting means such that the optical path length changes as a function of movement of said converting means;
a reference optical fiber system including an interferometer reference optical fiber, second proximal and distal gripers secured at respective opposite ends of said reference optical fiber, a second threaded stud, a second bracket secured to and inside said container, a second stress reliever secured to and extending between said second proximal gripper and said second threaded stud, and second clamping means for clamping said second threaded stud to said second bracket to provide a desired reference fiber tension and rotation;
wherein said reference optical fiber has an optical path length which is independent of movement of said converting means; and
temperature compensating means operatively attached to at least one of said sensor or reference optical fibers for changing the length of tile attached fiber as a function of temperature.

16. The transducer of claim 15 wherein said first and second clamping means each include at least one locking nut.

17. The transducer of claim 15 wherein said first clamping means includes a pair of locking nuts on opposite sides of said first bracket and through which said first stud is threaded.

18. The transducer of claim 15 wherein said second stress reliever is disposed between and extends between said second proximal gripper and said second bracket.

19. The transducer of claim 15 wherein all of said converting means, said sensor optical fiber system, said reference optical fiber system and said converting means are disposed within said container.

20. The transducer of claim 15 wherein said compensating means is disposed proximal to and in line with the proximal gripper of the attached said fiber.

21. The transducer of claim 15 further comprising a flexible stress reliever interconnecting said compensating means with said in-line proximal gripper.

22. The transducer of claim 15 wherein said converting means comprises a bellows.

23. The transducer of claim 15 wherein said converting means comprises a bourdon tube.

* * * * *